A. F. Cooper.
Carriage Wheel.
N° 99,851. Patented Feb. 15, 1870.
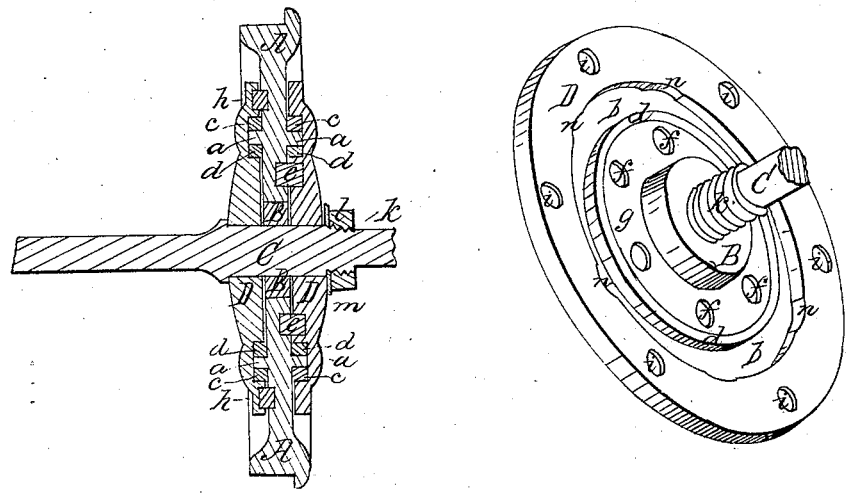
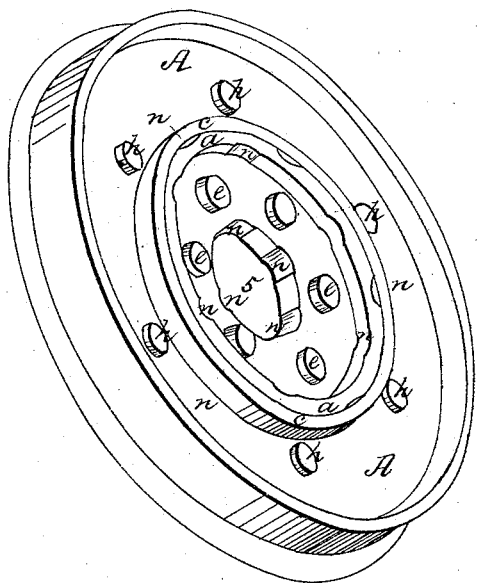
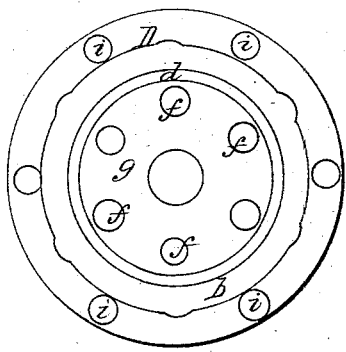
Witnesses;
W Cambridge
L E Batchelder
Inventor;
Almond F. Cooper
per his Attorneys
Teschemacher & Stearns

United States Patent Office.

ALMOND F. COOPER, OF SAN FRANCISCO, CALIFORNIA, ASSIGNOR TO HIMSELF AND JOHN G. TAPPAN, OF BOSTON, MASSACHUSETTS.

Letters Patent No. 99,851, dated February 15, 1870.

IMPROVED WHEEL FOR CARRIAGES AND OTHER VEHICLES.

The Schedule referred to in these Letters Patent and making part of the same.

To all whom it may concern:

Be it known that I, ALMOND F. COOPER, of San Francisco, in the county of San Francisco, and State of California, have invented certain Improvements in Wheels for Carriages, Railroad-Cars, and other Vehicles, of which the following is a full, clear, and exact description, reference being had to the accompanying drawings, making part of this specification, in which—

Figure 1 is a central longitudinal section through my improved wheel, in place upon its axle.

Figure 2 is a perspective view of my improved wheel, with one of its covering-plates removed.

Figure 3 is a perspective view of the inner side of one of the covering plates, with the axle applied thereto.

Figure 4 is a plan of the inner side of one of the covering plates.

My invention has for its object to produce a wheel of simple construction, which shall be elastic, and at the same time possess great strength and durability, and consists in the peculiar construction of the wheel, and in the manner of applying the elastic material thereto.

To enable others skilled in the art to understand and use my invention, I will proceed to describe the manner in which I have carried it out.

In the said drawings—

A is a solid wheel, with only a circular opening 5 at its center, in which snugly fits a rubber block B, of corresponding shape, surrounding an axle C.

Each side of the wheel has projecting from it, and formed in one and the same piece therewith, a circular flange $a$, upon and around which is placed a circular covering plate D, provided with an annular groove, $b$, a band of rubber, $c$, surrounding the flange, $a$, and being interposed between it and the outer side of the groove $b$, while another band of rubber, $d$, is interposed between the inside of the flange $a$ and the inner side of the groove $b$, the width of which corresponds exactly to the aggregate width of the rubber bands $c\ d$ and the flange $a$, by which construction the weight will be brought vertically upon the upper half of the band $c$ and the lower half of the band $d$, the elasticity of the rubber allowing the plate D to yield, whereby the concussion and noise incident to wheels of the ordinary construction are avoided, and the wear of the parts materially reduced.

On each side of the wheel A, within the space inclosed by the flange $a$, are a series of circular recesses for the reception of a series of rubber blocks or springs, $e$, which project out beyond the face of the wheel, and into a series of corresponding recesses, $f$, in the central portion, $g$, of the plate D, the recesses on one side of the wheel being opposite to the center of the spaces between the recesses on the other side.

Outside the flange $a$, and on each side of the wheel, are also formed another series of recesses, for the reception of another series of rubber blocks or springs $h$, which project out into corresponding recesses $i$ in the plate D.

These rubber blocks act as buffers or cushions, and serve in connection with the elastic rings $c\ d$, to support the weight upon the wheel; their principal office, however, is to prevent the wheel A from turning independently of the plates D, which are shrunk on to or otherwise firmly secured to the axle C, so that it will be impossible for them to revolve independently of each other.

Near one end of the axle C is cut a screw-thread, $k$, over which is turned a nut, $l$, which bears upon a washer, $m$, resting on the outer face of the outer covering plate D, which is thus kept in place with additional security.

The elastic blocks $e\ h$ project out sufficiently far to maintain the plates D at the proper distance from the sides of the wheel, so as not only to prevent friction, but to allow the wheel to have a slight lateral motion independently of the axle, in passing around curves.

Instead of two series of elastic blocks, one series only, either the inner or outer series, may be employed, and the blocks may be of some elastic material other than rubber, if preferred, or stiff spiral springs may be used in lieu of the blocks $e\ h$.

If desired, the plates D may be held with additional security by means of bolts passing through them and the wheel A, the holes in the latter being made sufficiently large to allow the plates to yield.

The exterior and interior of the flange $a$, the outer side of the groove $b$, and the sides of the central opening 5 are furnished with notches, $n$, which afford spaces into which the elastic material may expand when subjected to pressure, these notches also aiding to prevent the rings $c\ d$ and block B from being moved out of their proper positions. This elastic block B may be dispensed with, if desired.

It is evident that my improvements may be applied to carriage-wheels for ordinary roads, in which case the axle-box will pass through the central opening 5 and the plates D, and will be firmly secured to the latter.

Claim.

What I claim as my invention, and desire to secure by Letters Patent, is—

The wheel A, with its flange $a$, in combination with the grooved plate D, the elastic rings $c\ d$, and one or more series of elastic blocks or springs, the whole constructed and operating substantially as described, for the purpose set forth.

ALMOND F. COOPER.

Witnesses:
P. E. TESCHEMACHER,
W. J. CAMBRIDGE.